United States Patent Office 3,503,618
Patented Mar. 31, 1970

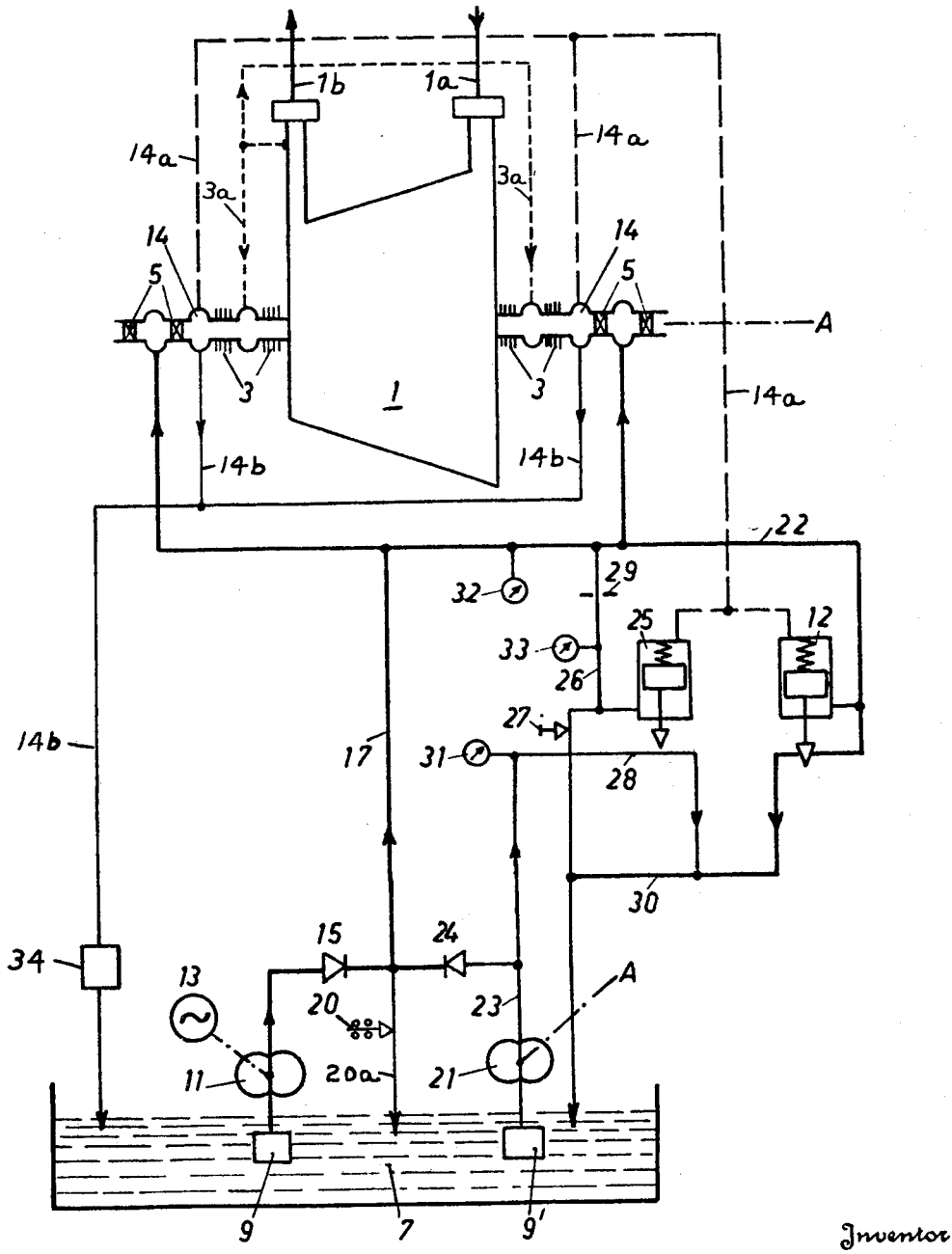

3,503,618
ARRANGEMENT FOR ENSURING SUPPLY OF PRESSURIZED SEALING FLUID TO SHAFT SEALS OF HIGH PRESSURE MACHINES TO PREVENT GAS LEAKAGE IN EVENT OF FAILURE OF MAIN OIL PUMP
Paul Real, Schlieren, Switzerland, assignor to Aktiengesellschaft Brown, Boveri & Cie, Baden, Switzerland, a joint-stock company
Filed Nov. 20, 1967, Ser. No. 684,120
Claims priority, application Switzerland, Dec. 23, 1966, 18,546
Int. Cl. F16j 15/40, 15/00
U.S. Cl. 277—15
5 Claims

ABSTRACT OF THE DISCLOSURE

An arrangement for delivering pressurized oil to seal structures for the shaft of a rotary high pressure gas machine to prevent escape of gas from the machine along the shaft surface comprises a main oil pump for normally supplying the oil seals at the desired pressure level and an auxiliary oil pump for supplying the oil seals in the event of a failure of the main oil pump. The auxiliary oil pump, which is thus used only in an emergency to take over the function of supplying the oil seals, is continuously driven from the shaft of the machine but runs in an essentially unloaded condition while the main oil pump is operating normally, all of the oil handled by the auxiliary pump being returned to the oil sump under this condition. However, in event of a failure of the main oil pump, pressure is caused to immediately build up on the discharge side of the auxiliary pump and flows from the same into the oil feed supply lines leading to the oil seals.

---

This invention relates to an improved arrangement for providing fluid seal structures to the shafts of rotary high pressure gas machines to prevent escape of gas from the machines along the surface of the shaft, and more particularly to an improvement in assuring an adequate supply of pressurized oil to the seals in the event the main oil supply should fail. This is accomplished by providing an emergency oil pump driven directly from the shaft of the machine itself which comes into operation automatically to take over the oil supply function of the main oil pump, which is driven by an electric motor, for example, in the event of a pump or electric failure or failure of the electrical mains supplying the electric drive motor.

High pressure rotary gas machines are provided with oil pressurized packing bushes to prevent escape of gas along the shaft, and the oil pumps which supply the pressurized oil to the packing bushes must operate at very high pressures of the order of, for example, 200 to 300 atmospheres. These extremely high pressure levels lead to the establishment of very heavy stresses in the pump parts, and particularly the bearings. In the event of pump failure, the ensuing failure of the oil pressure supply to the packing bushes along the shaft is bound to result in an immediate escape of the high pressure gas from within the machine along the shaft into the open notwithstanding the fact that the machine is shut down immediately. Moreover, the packing bushes being deprived of their normal lubricant supply run dry and are subject to damage. It is accordingly of the utmost importance that a continuous supply of pressurized oil be available at the packing bushes.

One known way of ensuring this continuous supply of oil to the packing bushes in the event of failure of the main oil pump, which is driven directly from the machine shaft, is to provide an auxiliary oil pump which is automatically put into operation, this later pump being also required for starting.

It is also possible to use an oil pump, for example, one which is driven by an electric motor energized from an A.C. supply mains, for the main and normal supply of pressurized oil to the packing bushes on the machine shaft, and to provide an emergency stand-by auxiliary, electric motor driven, oil pump powered from a spare direct-current mains system supplied by a direct current generator driven by a diesel engine or by an auxiliary steam turbine.

With these known arrangements, the required driving power, even when a small quantity of oil is involved, is very high as a result of the high delivery pressure, for example, over 30 kilowatts, so that starting is too slow for the oil supply to be completely taken over immediately, both with electrical and turbine drive. It has therefore been necessary for the emergency oil pump together with its associated drive to run continuously under idling conditions while the normal oil supply pump is in operation.

Another possible arrangement for immediately taking over the oil supply to the packing bushes in the event of a failure of the main pump resides in the provision of an elevated oil tank, or auxiliary tanks placed under a gas pressure via elastic diaphragms. However, this solution is expensive and cumbersome in view of the high pressures which are involved, and the required static height for elevated tanks.

The improved arrangement according to the present invention circumvents all of the disadvantages of the previously known emergency take-over measures and is characterized by the fact that the emergency oil pump is driven directly from the machine shaft and runs unloaded during the time that the main oil pump is operating normally to maintain a satisfactory flow of oil at the requisite pressure to the packing bushes on the machine shaft. In the event of failure of the main oil pump, the emergency oil pump comes into operation automatically and immediately to take over the supply of pressurized oil to the bushes.

The foregoing as well as other objects and advantages inherent in the invention will become more apparent from the following detailed description of one suitable embodiment thereof and the accompanying drawing, the single figure of which illustrates the invention by way of a schematic diagram.

With reference now to the drawing, the high pressure synthesis gas compressor 1 is provided with a low-pressure inlet duct 1a and a high-pressure outlet duct 1b, and is mounted for rotation on its shaft A by any suitable prime mover, not shown. The compressor 1 may also, of course, be used for any other purpose such as for compressing chemical media. A pair of axially spaced, high pressure gas seals 3 of the labyrinth type surround shaft A at each end of the compressor and are supplied with gas from the high pressure side of machine 1 over the dashed lines 3a. Located outwardly along shaft A from each of the labyrinth seals 3 are a pair of axially spaced oil pressurized and lubricated packing bushes 5, these bushes 5 being supplied with oil from a system of the so-called controlled leakage return type wherein the oil at the bush is maintained at a predetermined pressure by varying the amount of oil returned to the oil sump from the oil pressurized feed lines in accordance with any departure in oil pressure from the pressure level desired to be maintained at the bush. The main oil supply system includes an oil sump 7, a filter 9 immersed in the oil, and an oil pump 11 driven by an electric motor 13. The intake to pump 11 is connected to the outlet of filter 9, and the discharge side of pump 11 is connected through a non-return valve 15 to a main oil feed line 17 through which pressurized oil is fed to the packing bushes 5. A leakage return line 22 is connected to the feed line 17 and leads through a control valve 12 and return line 30 back to the oil sump 7. Valve 12 is controlled by the joint gas pressure which exists in chambers 14 which surround shaft A and are located intermediate the labyrinth seals 3 and the packing bushes 5, the gas pressure control lines from chambers 14 to the cylinder of valve 12 being indicated by the dashed lines 14a. As the gas pressure in chambers 14 rises, oil control valve 12 moves to a more closed position thus reducing the rate of oil leakage return from the main oil feed line 17 back to the sump 7 through line 22, valve 12 and line 30, and increasing correspondingly the oil pressure in line 17 to counter the increase in gas pressure. Conversely, as the gas pressure in chambers 14 drops, control valve 12 will move to a more open position, thus increasing the rate of oil leakage return from the pressurized oil feed line 17 to sump 7 and decreasing the oil pressure in line 17. Lines 14b serve to carry back to the oil sump 7 through an oil trap 34 any oil reaching the chambers 14 through the packing bushes 5.

In the event of a failure of the main oil pump 11, the invention provides an emergency system for supplying oil to the shaft packing bushes 5. This emergency system includes an auxiliary i.e. emergency oil pump 21 which also receives its oil from sump 7 through another filter 9' and which is driven directly from the machine shaft A. The outlet side of pump 21 is connected through line 23 and non-return valve 24 with the main pressurized oil feed line 17, and line 23 is also connected back to the sump 7 through a return path which includes line 28, control valve 25 and line 30. Operation of control valve 25 is also made dependent upon the gas pressure in chambers 14 but this valve is so set that it remains fully open while the oil system is working normally, i.e. with the main oil pump 11 operational and supplying the packing bushes 5 with the required amount of oil at the desired pressure. With valve 25 fully open, there is practically no pressure built up in the output line 23 since all of the oil pumped by pump 21 returns freely through the open valve 25 to sump 7 and hence, this pump runs under practically a no-load condition.

However, in the event that the pressure in the main oil feed line 17 drops off to a point which is indicative of failure of the main pump 11 to deliver its normal quantity of oil at the desired pressure, the resulting gas pressure change at control valve 25 begins to close off the return line 28 thus increasing the pressure in line 23 from the emergency pump 21 and causing oil from this pump to feed through non-return valve 24 and into the main oil feed line 17, though at a somewhat lower excess pressure value—depending upon the manner in which valve 25 is set in relation to valve 12.

The invention also provides an arrangement for testing whether or not the control valve 25—which is fully open under normal operating conditions—will close correctly in the event of a failure at the main oil pump 11. This includes a return line 26 from the main oil feed line 17 back to the sump 7 through a pressure constrictor 29 of the orifice type and a manually operated test valve 27 by means of which the pressure in the branch line 26 may be reduced to simulate a drop in pressure in the main oil feed line 17. This checking procedure may be followed by observing a manometer 31 connected into the oil return line 28 from emergency pump 21, a second manometer 32 connected into the main oil feed line 17, and a third manometer 33 connected in the branch line 26.

A safety overpressure valve 20 controlling a line 20a leading directly back to sump 7 from the main oil feed line 17 is provided to permit a direct flow back of oil from the pumps in the event that the oil pressure exceeds that which has been predetermined for the system.

The improved oil feed arrangement according to the invention imposes no wear on the auxiliary oil pump because it normally runs in an unloaded condition and thus—because it is running at full speed, being driven directly from shaft A—is instantaneously and reliably available for emergency duty in taking over the task of supplying pressurized oil to the packing bushes 5 in the event of failure of the main pump 11. While the emergency pump 21 is operating, pump 11 can be repaired if the trouble is due to the pump itself, or if the failure is in the electric drive motor 13 for pump 11 or in the electrical mains supplying motor 13, these can be properly taken care of. After repairs have been made, pump 11 can be restored to its normal duty thus automatically placing the emergency pump 21 again in its standby condition so as to again run under essentially a no-load condition.

In the event of a complete failure of the plant, the directly driven auxiliary pump 21, of suitable capacity, takes over the oil supply to the packing bushes 5 almost until the shaft A comes to rest and thus prevents dry running of the bushes and undesirable loss of gas under pressure from the machine.

The improved oil feed system has the advantage of being economical in cost because it is most simple in its design and also provides a most reliable and immediate emergency oil supply for the packing bushes in the event of a failure in the main oil supply.

I claim:

1. An arrangement for supplying pressurized oil to oil seals for the shaft of a rotary high pressure machine to prevent the escape of gas from the machine along the shaft surface which comprises a main oil pump for normally supplying pressurized oil to the oil seals, means, independent of said machine for driving said pump, oil line means extending from the main oil pump to the oil seals for normally supplying pressurized oil to the seals, an auxiliary oil pump driven continuously from the shaft of said machine, an oil sump, means for supplying oil from the sump to the auxiliary oil pump, means responsive to the oil pressure produced by said main oil pump for returning the oil delivered by said auxiliary pump directly to said sump while by-passing said oil line means and oil seals whereby said auxiliary pump normally operates in a substantially unloaded condition and said pressure responsive means automatically directing pressurized oil from the auxiliary pump to the oil seals when there is a reduction of oil pressure produced by the main oil pump.

2. An arrangement for providing pressurized oil to seals for the shaft of a rotary high pressure machine to prevent escape of gas from the machine along the shaft surface which comprises a main oil pump for normally supplying said oil seals with pressurized oil, said oil seals being located on said shaft outwardly from gas seals provided on said shaft and a pressure chamber being located on said shaft intermediate said oil and gas seals, a first pressurized oil feed line extending between the discharge side of said main oil pump and said oil seals, a leakage return line from said oil feed line to an oil sump, a control valve in said leakage return line having an operating range intermediate its fully closed and fully open positions to control the rate at which oil is permitted to flow back through said leakage return line and thereby control the oil pressure at said oil seals, means operating said control valve in accordance with the pressure existing in said pressure chamber, an auxiliary oil pump continuously driven from the shaft of said machine, a second oil feed line extending from the discharge side of said auxiliary oil pump to said oil seals, a second leakage return line from said second oil feed line to said oil sump, a second control valve in said second leakage return line, and means operating said second control valve in accordance with the pressure existing in said pressure chamber, said second control valve being normally in its open position to return essentially all of the oil pumped by said auxiliary pump to said sump when said main oil pump is operating normally to supply said oil seals, and said second control valve being shifted towards its closed position immediately upon failure of said main oil pump as reflected by a change in pressure in said pressure chamber thereupon to effect delivery of oil from said auxiliary oil pump through said second oil feed line to said oil seals.

3. An arrangement as defined in claim 2 wherein said first and second oil feed lines include portions common to one another, and other portions separate from one another at the discharge sides of the pumps and which include non-return valves.

4. An arrangement as defined in claim 2 and which further includes another leakage return line to said oil sump from said first oil feed line for test purposes, said test leakage return line including a manually operated control valve therein by which one may simulate failure of said main oil pump to test the operability of said auxiliary oil pump.

5. An arrangement as defined in claim 4 and which further includes a manometer in said test leakage return line and manometers in said first and second oil feed lines.

References Cited

UNITED STATES PATENTS

| | | | |
|---|---|---|---|
| 2,159,057 | 5/1939 | Sterrett | 277—15 |
| 2,903,280 | 9/1959 | Cuny | 277—15 |
| 3,005,518 | 10/1961 | Jassniker | 277—15 X |
| 3,131,939 | 5/1964 | Cuny | 277—15 |

SAMUEL ROTHBERG, Primary Examiner